(12) United States Patent
Waldorf et al.

(10) Patent No.: US 10,080,209 B2
(45) Date of Patent: Sep. 18, 2018

(54) APPARATUS AND METHOD FOR IDENTIFYING A MOVING WIFI ACCESS POINT AND MANAGING CONNECTIONS THEREWITH

(71) Applicant: Ipass Inc., Redwood City, CA (US)

(72) Inventors: Keith Waldorf, Santa Clara, CA (US); Tomasz Magdanski, Redwood City, CA (US); Raghu Konka, Pleasanton, CA (US); Rahul Jain, Belmont, CA (US)

(73) Assignee: IPASS INC., Redwood City, CA (US)

( * ) Notice: Subject to any disclaimer, the term of this patent is extended or adjusted under 35 U.S.C. 154(b) by 100 days.

(21) Appl. No.: 15/273,434

(22) Filed: Sep. 22, 2016

(65) Prior Publication Data

US 2018/0084520 A1 Mar. 22, 2018

(51) Int. Cl.
*H04W 64/00* (2009.01)
*H04W 48/16* (2009.01)
*H04W 84/12* (2009.01)

(52) U.S. Cl.
CPC ........ *H04W 64/003* (2013.01); *H04W 48/16* (2013.01); *H04W 84/12* (2013.01)

(58) Field of Classification Search
CPC .... H04W 64/003; H04W 48/16; H04W 84/12
See application file for complete search history.

(56) References Cited

U.S. PATENT DOCUMENTS

| 2006/0095348 | A1 | 5/2006 | Jones et al. | |
|---|---|---|---|---|
| 2006/0106850 | A1 | 5/2006 | Morgan et al. | |
| 2006/0217131 | A1 | 9/2006 | Alizadeh-Shabdiz et al. | |
| 2008/0176583 | A1 | 7/2008 | Brachet et al. | |
| 2011/0070863 | A1* | 3/2011 | Ma | H04W 4/02 455/410 |
| 2013/0155849 | A1* | 6/2013 | Koodli | H04L 45/308 370/230 |
| 2013/0155851 | A1* | 6/2013 | Koodli | H04L 45/308 370/230 |
| 2013/0155965 | A1* | 6/2013 | Koodli | H04W 64/003 370/329 |

(Continued)

OTHER PUBLICATIONS

International Search Report dated Jan. 9, 2018, for PCT Application No. PCT/US2017/052547, filed on Sep. 20, 2017, 4 pages.

(Continued)

*Primary Examiner* — Ajay Cattungal

(74) *Attorney, Agent, or Firm* — Cooley LLP

(57) ABSTRACT

A server has a processor and a memory connected to the processor. The memory stores instructions executed by the processor to collect scan lists from client devices. Each scan list specifies a WiFi access point identifier collected by a client device and geographic coordinates of the client device when the WiFi access point identifier was collected. A cluster of geographic coordinates is formed around a designated WiFi access point. A centroid within the cluster is identified. The location of the centroid is ascribed as the geographic position of the designated WiFi access point. A client device is advised when the designated WiFi access point is a known mobile WiFi access point to facilitate connection between the client device and the known mobile WiFi access point.

10 Claims, 4 Drawing Sheets

(56) References Cited

U.S. PATENT DOCUMENTS

| | | | |
|---|---|---|---|
| 2013/0260813 A1* | 10/2013 | Agerstam | H04W 48/08 455/517 |
| 2014/0087763 A1* | 3/2014 | Gao | H04W 4/023 455/456.3 |
| 2014/0206382 A1* | 7/2014 | Shabtay | G01S 5/0284 455/456.1 |
| 2014/0342752 A1 | 11/2014 | Jones et al. | |
| 2015/0220993 A1* | 8/2015 | Bente | G06Q 30/0267 705/14.58 |
| 2015/0289225 A1* | 10/2015 | Gao | H04W 64/003 455/456.5 |
| 2016/0007184 A1 | 1/2016 | Kulikov | |
| 2016/0241998 A1* | 8/2016 | Choi | H04W 4/021 |
| 2017/0156149 A1* | 6/2017 | Lin | H04W 72/0453 |
| 2017/0245280 A1* | 8/2017 | Yi | H04K 3/00 |

OTHER PUBLICATIONS

Written Opinion of the International Searching Authority dated Jan. 9, 2018, for PCT Application No. PCT/US2017/052547, filed on Sep. 20, 2017, 6 pages.

* cited by examiner

APPARATUS AND METHOD FOR IDENTIFYING A MOVING WIFI ACCESS POINT AND MANAGING CONNECTIONS THEREWITH

FIELD OF THE INVENTION

This invention relates generally to establishing connections in WiFi networks. More particularly, this invention relates to techniques for identifying a moving WiFi access point and managing connections with the moving WiFi access point.

BACKGROUND OF THE INVENTION

WiFi is a technology that allows electronic devices to connect to a wireless local area network (WLAN) through an access point. The term WAP is used herein to denote a WiFi access point. WAP connections are commonly free and therefore there is a growing interest in connecting to WAPs as often as possible.

A client device continuously probes its environment to identify available WAPs. Each probe and attempted connection consumes computation resources and battery power. In the case of a moving client device (e.g., a client device in a car, train or other vehicle), the client device is potentially exposed to a large number of WAPs. Continuously attempting to make connections in a moving environment is likely to result in a large number of failed or transitory connections, which degrade computation resources, battery life and a user experience. If one disables WAP connection attempts in a moving client device, one may forego the opportunity to connect a WAP that is moving (e.g., a WAP on a bus, train, ship or other vehicle).

Accordingly, there is a need to identify a moving WiFi access point and manage connections with it.

SUMMARY OF THE INVENTION

A server has a processor and a memory connected to the processor. The memory stores instructions executed by the processor to collect scan lists from client devices. Each scan list specifies a WiFi access point identifier collected by a client device and geographic coordinates of the client device when the WiFi access point identifier was collected. A cluster of geographic coordinates is formed around a designated WiFi access point. A centroid within the cluster is identified. The location of the centroid is ascribed as the geographic position of the designated WiFi access point. A client device is advised when the designated WiFi access point is a known mobile WiFi access point to facilitate connection between the client device and the known mobile WiFi access point. Mobility criteria are applied when the designated WiFi access point is unknown or is believed to be a stationary WiFi access point. The designated WiFi access point is categorized as a mobile WiFi access point or a stationary WiFi access point to form a categorized WiFi access point. The categorized WiFi access point is added to a WiFi access point list.

A client device has a processor and a memory connected to the processor. The memory stores instructions executed by the processor to determine that the client device is in an in-motion state or a stationary state. The stationary state is tested against a threshold to establish a confirmed stationary state or an unconfirmed stationary state. WiFi access point requests are enabled in response to a confirmed stationary state. WiFi access point requests are enabled in response to the in-motion state and an available moving WiFi access point. WiFi access point requests are disabled in response to the in-motion state and no available moving WiFi access point.

BRIEF DESCRIPTION OF THE FIGURES

The invention is more fully appreciated in connection with the following detailed description taken in conjunction with the accompanying drawings, in which:

FIG. 4 illustrates a cluster of geographic coordinates associated with a WiFi access point formed in accordance with an embodiment of the invention.

Like reference numerals refer to corresponding parts throughout the several views of the drawings.

DETAILED DESCRIPTION OF THE INVENTION

Figure 1:
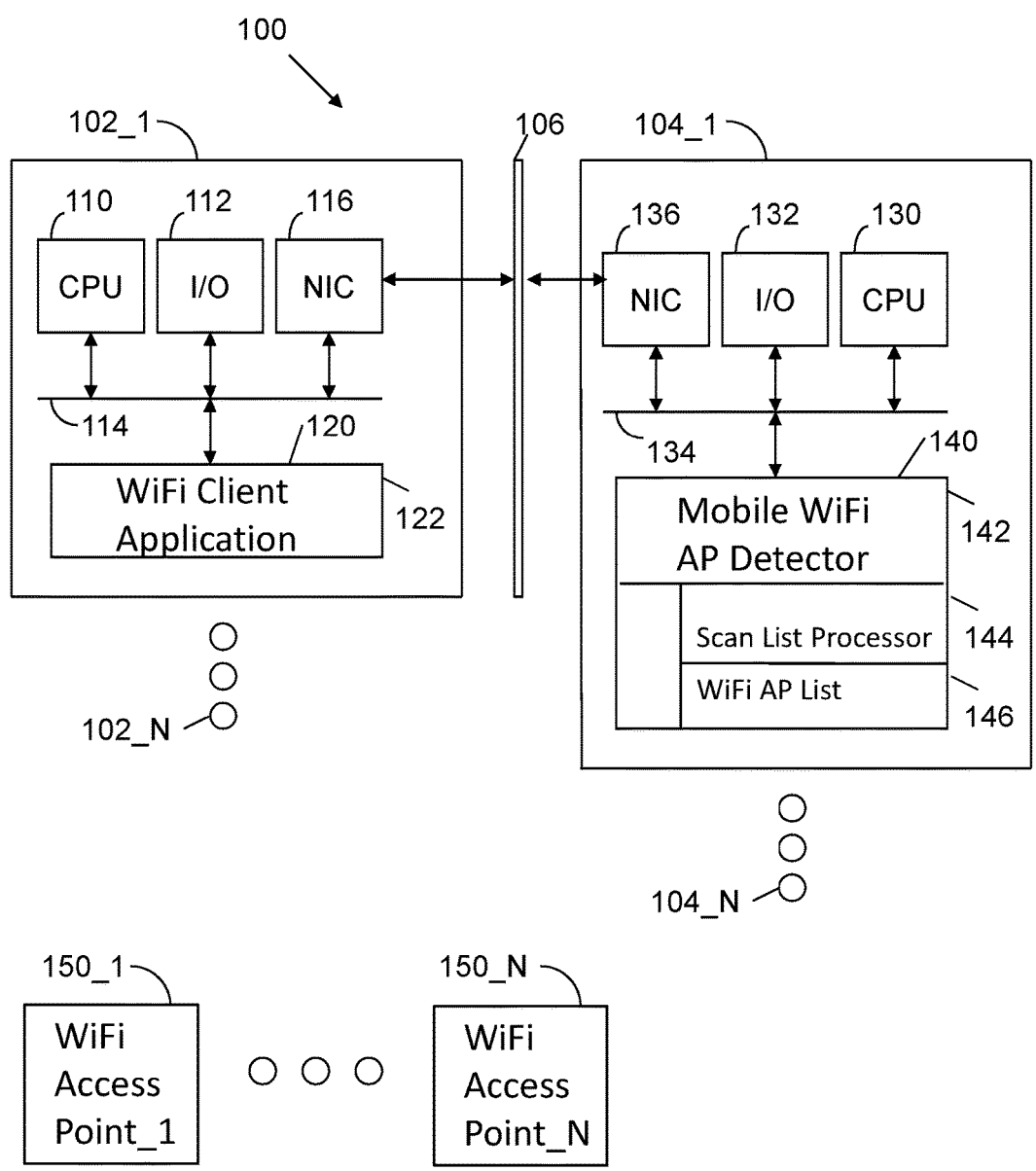
FIG. 1 is a system configured in accordance with an embodiment of the invention.

FIG. 1 illustrates a system 100 configured in accordance with an embodiment of the invention. The system 100 includes a set of client devices 102_1 through 102_N connected to a set of servers 104_1 through 104_N via a network 106, which may be any combination of wired and wireless networks.

Each client device (e.g., client device 102_1) includes a central processing unit 112 connected to input/output devices 112 via a bus 114. The input/output devices 112 may include a keyboard, mouse, touch display and the like. A network interface circuit 116 is also connected to the bus 114 and provides connectivity to network 106. A memory 120 is also connected to the bus 114. The memory 120 stores instructions executed by the central processing unit 110. In particular, the memory 120 stores a WiFi client application 122 to implement operations disclosed herein. The client device 102_1 may be a computer, tablet, mobile phone, wearable device, game console and the like.

Each server (e.g., server 104_1) also includes a central processing unit 130, input/output devices 132, bus 134 and network interface circuit 136. A memory 140 is connected to the bus 134. The memory 140 stores instructions executed by the central processing unit 130. In particular, the memory 140 stores a mobile WiFi access point detector 142. As its name implies, this module is configured to identify WiFi access points that are in motion. The module 142 may include a scan list processor 144 used to identify mobile WiFi access points. The scan list processor 144 produces a WiFi access point list 146, which is a list of identified WiFi access points and designations of whether a WiFi access point is mobile or stationary.

Each client device may use its network interface circuit 116 to make WiFi connections to different WiFi access points 150_1 through 150_N. The WiFi client application 122 receives a designation from the mobile WiFi access point detector 142 whether any given WiFi access point is in motion.

Figure 2:
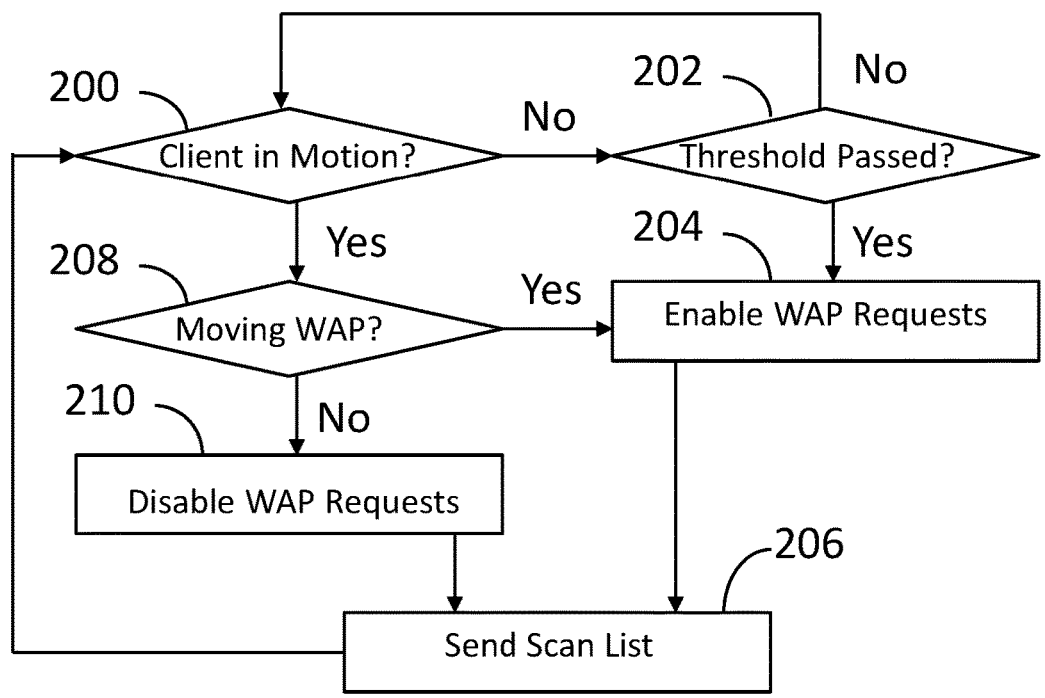
FIG. 2 illustrates client device processing performed in accordance with an embodiment of the invention.

FIG. 2 illustrates processing operations associated with the WiFi client application 122. Initially it is determined whether the client device is in motion 200. The motion designation may be based upon accelerometer signals associated with the client device. If the client device is not in motion (200—No) it is determined whether it has been motionless for some predetermined threshold period. If the threshold is passed (202—Yes), the client device is in a confirmed stationary state. Therefore, WiFi access point (WAP) requests are enabled within the device 204. The threshold may be useful in the case of a client device in a car experiencing stop and go traffic. A lack of motion at a stop light may be followed by motion; the threshold may prevent changes of state when there is only a temporary suspension of motion.

The motion determination need not be limited to a binary condition of motion or no motion. An embodiment of the invention contemplates a "walking mode". The walking mode corresponds to accelerometer signal signatures that evidence a client device being carried by an individual walking. The walking mode may be treated in the same manner as a completely stationary mode. After WAP requests are enabled 204, the client device periodically sends scan lists to the server 206, as discussed below.

If a client is in motion (200—Yes), it is determined whether it is proximate to a moving WAP 208. A moving WAP is a WAP previously identified using the operations discussed in connection with FIG. 3. If the client is proximate to a moving WAP (208—Yes), WAP requests are enabled 204. If the WAP is stationary or unknown (208—No), WAP requests are disabled 210. The disabling of WAP requests would not typically transpire during walking mode. Rather, the disabling would typically be invoked in the event of constant motion indicative of a client device on a moving vehicle. After disabling WAP requests (210—No), a scan list is periodically sent to the server 206. Disabling WAP requests in the case of a moving client device avoids attempts to make connections to stationary WAPs. Such connections are likely to fail or be transitory. Avoiding such connections preserves client device computation resources and battery life; it also improves the user experience since unsuccessful and/or transitory WAP connections are avoided.

Figure 3:
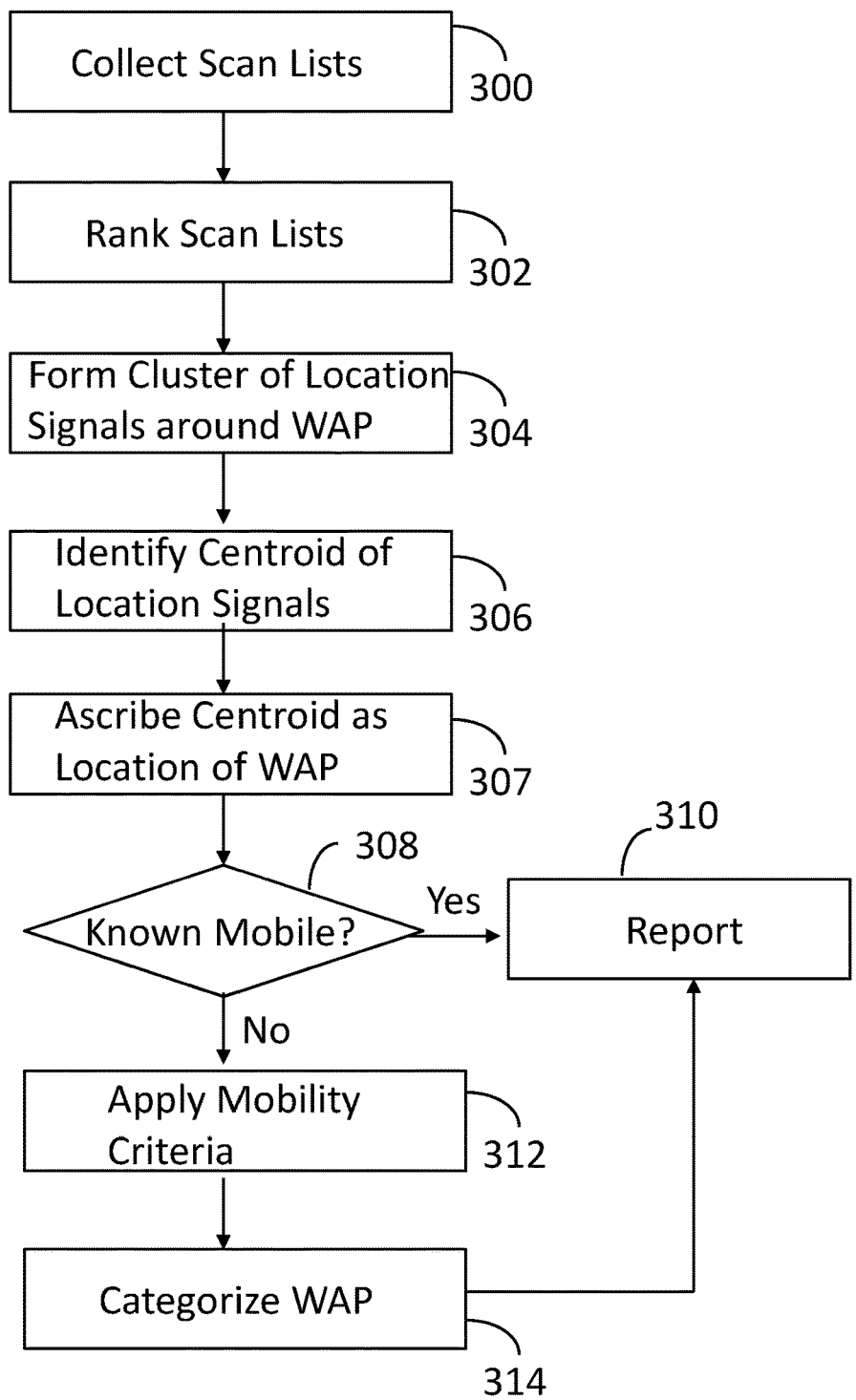
FIG. 3 illustrates mobile WiFi access point detection operations performed in accordance with an embodiment of the invention.

FIG. 3 illustrates processing operations associated with an embodiment of the mobile WiFi access point detector 142. Initially, scan lists are collected 300. The scan lists are collected from client devices 102_1 through 102_N via network 106. Each scan list includes individual entries specifying an access point identifier and physical coordinates of the client device when the access point was identified. The physical coordinates maybe GPS coordinates supplied by the client device.

The scan lists are then ranked 302. The rankings may be used to ascribe different weights to information generated by different client devices. In one embodiment, the ranking is based upon a mobile device value, a signal value and a measure of geographic accuracy. An example ranking schema is as follows:

Ranking=(Device Value*a large scale factor)+(Signal Strength*a small scale factor)−(Measure of geographic accuracy).

The large scale factor may be 100 times the small scale factor. The device value may be determined based upon whether the GPS of the client device is enabled. If so, the device value is significantly more (e.g., 5×) than if the GPS is not enabled. The measure of geographic accuracy may be a combination of the geographic accuracy of the data from the client device and the age of the collected data. The age may be the difference between the scan timestamp in seconds and the cache timestamp in seconds. The cache timestamp is a measure of how old geographic information is. The older the information, the less reliable it is since the client device may have moved from the recorded geographic location. While it is possible to obtain fresh geographic location in each communication session, a caching of geographic information is commonly implemented to preserve computation and battery resources.

The scan list rank is a measure of the reliability of the information received. The system receives scan lists from a variety of client devices with different levels of geographic accuracy. Information from a number of client devices about a single designated WAP may prioritized based upon rank. The information may also be combined and weighted in accordance with ranks.

Figure 4:
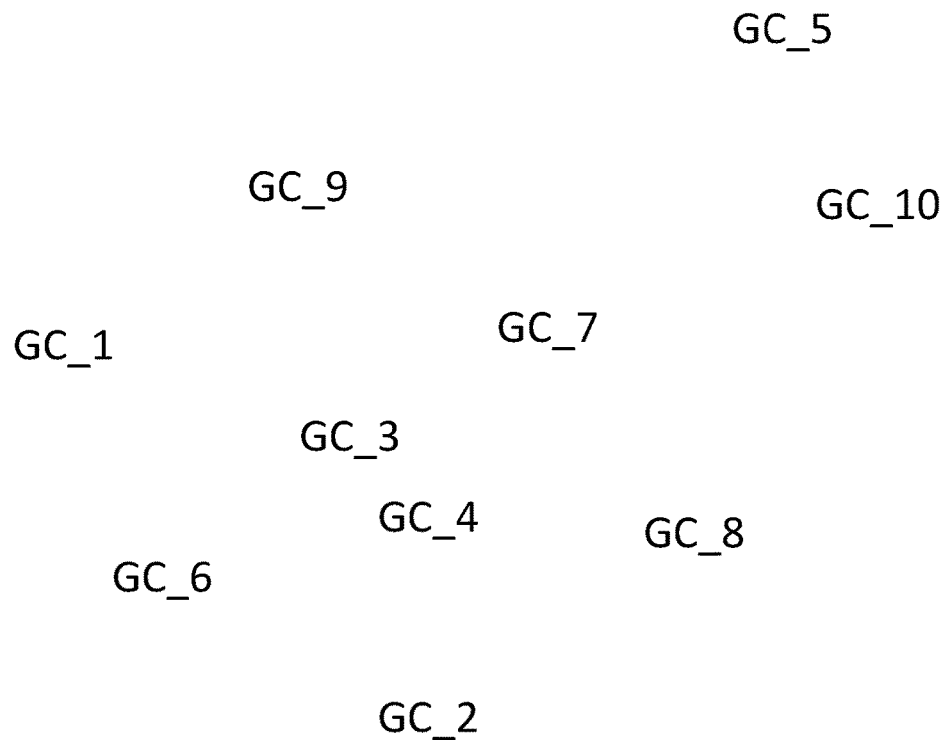

The next operation of FIG. 3 is to form a cluster of location signals around a WAP 304. The location signals are supplied by the client device each time the WAP is observed. FIG. 4 is an exemplary positioning of geographic coordinates (GC). Ten GC readings GC_1 through GC_9 are associated with this example for simplicity. The actual number of geographic coordinates may be much larger. The large number of coordinates may be from a single client device. Alternately, for any designated WAP, coordinates from different client devices may be aggregated.

Returning to FIG. 3, the next operation is to identify the centroid of the location signals. The centroid is the geometric center of all geographic coordinates shown in FIG. 4. It is the arithmetic mean or average position of all the points in the collection of points. Any number of known techniques may be used to compute the centroid and to assign a measure of confidence to it.

The centroid location is ascribed as the physical location of the WAP 307. It is then determined whether the WAP is a known mobile WAP 308. If so (308—Yes), the status is reported 310. For example, the server 104_1 sends a message over network 106 to client device 102_1 indicating that it is acceptable to connect to a mobile WAP. If the WAP is not known or is known and is thought to be stationary (308—No), mobility criteria are applied 312.

Mobility criteria may be based upon an analysis of the physical distribution of geographic coordinates. For example, if a large number of location signals are far (e.g., more than 1 Km) from the centroid, this is strong evidence that the WAP is moving.

Mobility criteria may also be based upon characteristics of the Media Access Control (MAC) addresses observed. A majority of moving hotspots are other client devices. Such client devices commonly have their MAC address locally overridden to protect user privacy. Therefore, if a MAC address is locally assigned, there is a high likelihood that the device is a mobile phone that is not stationary. Connections to such a device would typically not be attempted, but it is useful to characterize all observed moving hotspots. Such information may be useful in ascribing characteristics to nearby WAPs.

Based upon the application of mobility criteria 312, the WAP is categorized 314 as being a mobile WAP or a stationary WAP to form a categorized WAP. The categorized WAP is reported. That is, the categorized WAP is placed in the WiFi AP list 146 for future utilization by a client device.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A server, comprising:
   a processor; and
   a memory connected to the processor, the memory storing instructions executed by the processor to:
   collect scan lists from client devices, wherein each scan list specifies a WiFi access point identifier collected by a client device and geographic coordinates of the client device when the WiFi access point identifier was collected,
   form a cluster of geographic coordinates around a designated WiFi access point,
   identify a centroid within the cluster,
   ascribe the location of the centroid as the geographic position of the designated WiFi access point,
   advise a client device when designated WiFi access point is a known mobile WiFi access point,
   apply mobility criteria when the designated WiFi access point is unknown or is believed to be a stationary WiFi access point,
   categorize the designated WiFi access point as a mobile WiFi access point or a stationary WiFi access point to form a categorized WiFi access point, and
   add the categorized WiFi access point to a WiFi access point list.

2. The server of claim 1 further comprising instructions executed by the processor to rank the scan lists.

3. The server of claim 2 wherein the instructions executed by the processor to rank the scan lists is based upon a mobile device value, a signal value and a measure of geographic accuracy.

4. The server of claim 3 wherein the mobile device value is a function of whether global positioning data is enabled on the mobile device.

5. The server of claim 3 wherein the signal value is a measure of signal strength from the designated WiFi access point.

6. The server of claim 3 wherein the measure of geographic accuracy is derived from geographic accuracy information from the mobile device and a measure of the age of the geographic information.

7. A client device, comprising:
   a processor; and
   a memory connected to the processor, the memory storing instructions executed by the processor to:
   determine that the client device is in an in-motion state or a stationary state;
   test the stationary state against a threshold to establish a confirmed stationary state or an unconfirmed stationary state,
   reapply the determine operation in response to an unconfirmed stationary state,
   enable WiFi access point requests in response to a confirmed stationary state,
   enable WiFi access point requests in response to the in-motion state and an available moving WiFi access point, and
   disable WiFi access point requests in response to the in-motion state and no available moving WiFi access point.

8. The client device of claim 7 wherein the stationary state includes motion characteristic of an individual walking with the client device.

9. The client device of claim 7 further comprising instructions executed by the processor to send a scan list to a server, wherein the scan list specifies a WiFi access point identifier collected by the client device and geographic coordinates of the client device when the WiFi access point identifier was collected.

10. The client device of claim 7 wherein the instructions to determine that the client device is in an in-motion state or a stationary state include instructions to analyze client device accelerometer signals.

* * * * *